United States Patent [19]

Adams

[11] Patent Number: 4,938,204
[45] Date of Patent: Jul. 3, 1990

[54] WATER HEATER OR BOILER WITH IMPROVED THERMAL EFFICIENCY

[75] Inventor: Charles L. Adams, Euless, Tex.

[73] Assignee: PVI Industries, Inc., Fort Worth, Tex.

[21] Appl. No.: 395,475

[22] Filed: Aug. 18, 1989

[51] Int. Cl.$^5$ .............................................. F24H 1/20
[52] U.S. Cl. .................................. 126/360 R; 122/17; 122/14; 122/19; 122/33
[58] Field of Search .......................... 122/13 R, 17, 14; 126/360 R, 360 A

[56] References Cited

U.S. PATENT DOCUMENTS

| | | | |
|---|---|---|---|
| 3,407,805 | 10/1968 | Bougard | 126/360 A |
| 3,534,726 | 10/1970 | Frelick, Jr. | 126/360 A |
| 3,757,745 | 9/1973 | Miller | 126/360 R |
| 4,192,260 | 3/1980 | Ostbo . | |
| 4,222,350 | 9/1980 | Pompei et al. | 122/33 |
| 4,280,450 | 7/1981 | Maruyama . | |
| 4,344,386 | 8/1982 | Black | 122/14 |
| 4,524,726 | 6/1985 | Bindl | 122/13 R |
| 4,541,410 | 9/1985 | Jantana . | |
| 4,545,329 | 10/1985 | Adams . | |
| 4,583,494 | 4/1986 | Gordon, Jr. . | |
| 4,633,821 | 1/1987 | Cleer, Jr. . | |
| 4,644,904 | 2/1987 | Metz | 122/17 |
| 4,660,541 | 4/1987 | Moore | 122/17 |
| 4,790,268 | 12/1988 | Eising | 122/14 |

Primary Examiner—Edward G. Favors
Assistant Examiner—Denise L. Ferensic
Attorney, Agent, or Firm—Charles D. Gunter, Jr.

[57] ABSTRACT

A water heater/boiler design is shown having a tank with a submergible, pressurized combustion chamber so that all of the heating surfaces of the combustion chamber are submerged under water. The products of combustion are routed from the submerged combustion chamber to a secondary heat exchanger having heat exchange tubes which are also submerged in the tank. A forced draft burner is used to heat the combustion chamber and the burner inlet air is preheated by passing the inlet air over portions of the secondary heat exchanger located on the exterior of the tank.

14 Claims, 2 Drawing Sheets

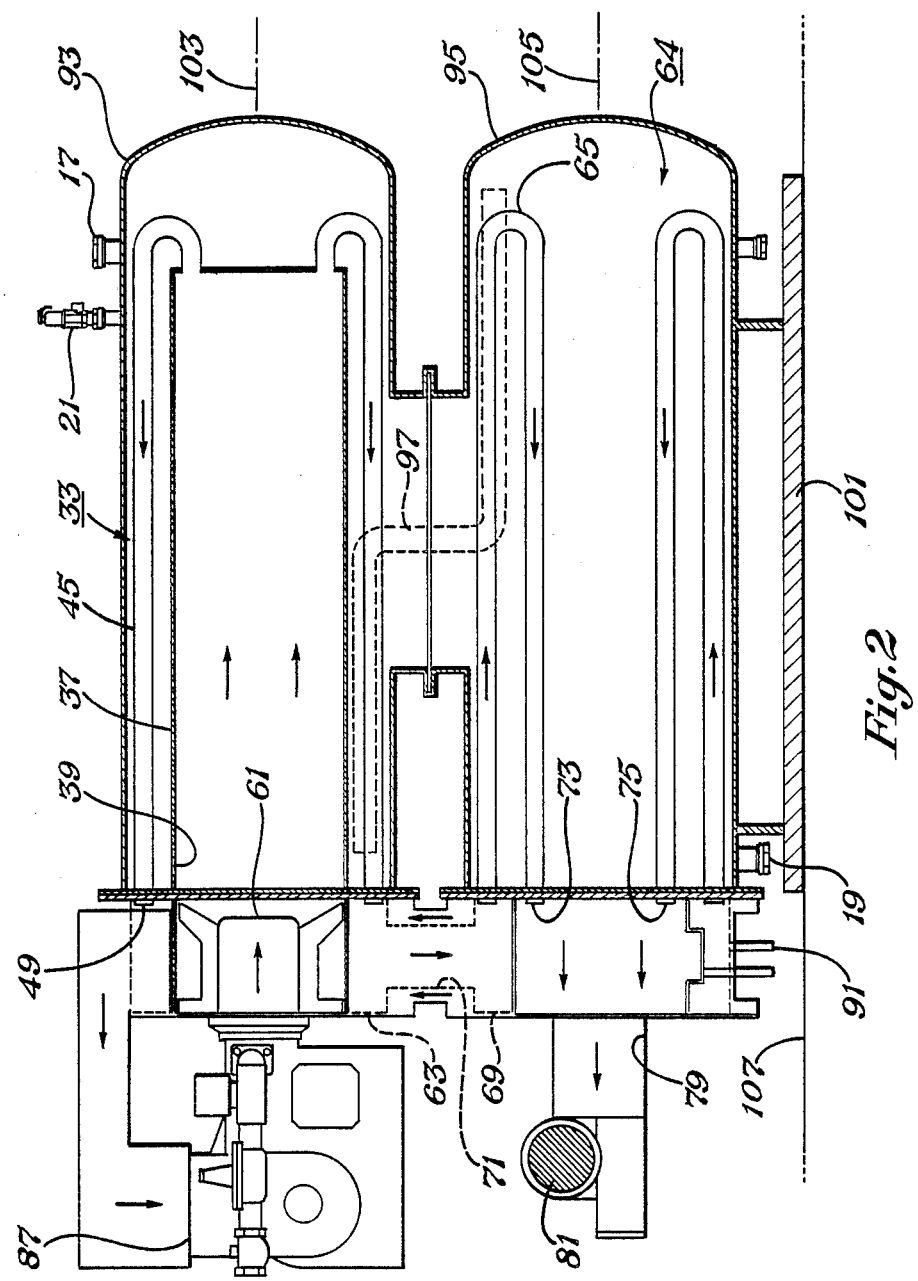

WATER HEATER OR BOILER WITH IMPROVED THERMAL EFFICIENCY

BACKGROUND OF THE INVENTION

1. Field of the Invention

The present invention relates generally to gas, oil and gas/oil fired water heaters and boilers of the type utilizing a submergible combustion chamber for supplying heat to the closed tank interior of the device.

2. Description of the Prior Art

Prior art water heaters of the type under consideration have typically provided for the flow of hot gas through a series of tubes which are mounted in vertical fashion between top and bottom support plates within the water heater tank. In this discussion, the term "water heater" will be understood to encompass both water heaters and "boilers" of the type utilized for commercial/industrial use, as well as for residential use. Water was circulated into and out of a chamber in the prior art device located between the support plates. The water contacted and circulated about the exterior of the vertical tubes to effect heat transfer to heat the water.

The typical prior art gas, oil or gas/oil fired water heater featured a non-pressurized external combustion chamber. The location of the combustion chamber on the exterior of the water heater resulted in lost heat and lower thermal efficiency. Also, the tubes and support plates were not easily accessible which generally required disassembly of the entire tank for maintenance and replacement.

In U.S. Pat. Nos. 4,465,024 and 4,545,329, both assigned to the assignee of the present invention, a water heater design was shown which featured a submergible, pressurized combustion chamber so that all combustion took place in the water heater tank interior in a chamber surrounded by water. The resulting design decreased heat loss and increased the thermal efficiency of the water heater in the range of 83% (fuel to water) and above.

In spite of the above improvements, the need continues to exist for a water heater design with a thermal efficiency exceeding that achievable with a submerged pressurized chamber alone.

The present invention has as its object to further improve the submergible combustion chamber type water heater design for increased thermal efficiency.

It is an object of the present invention to provide a water heater design of the above type which is characterized by a thermal efficiency (fuel to water) of 98% and above.

SUMMARY OF THE INVENTION

The water heater of the invention includes at least one closed tank normally containing water under pressure with a sidewall having a primary sidewall opening. A submergible, pressurized combustion chamber with multiple external heating surfaces is installed within the primary sidewall opening so that all of the heating surfaces are submerged in the water under pressure at a first location within the tank. Secondary heat exchange means are provided for preheating water at a second location which is below the first location within the closed tank. Passage means conduct the products of combustion generated in the submergible, pressurized combustion chamber to the secondary heat exchange means so that cooler water entering the tank is preheated by the secondary heat exchange means prior to contacting the external heating surfaces of the submergible combustion chamber.

Preferably, a forced draft burner having a burner inlet is mounted on the exterior of the closed tank and communicates with the combustion chamber for causing combustion to take place within the submergible, pressurized combustion chamber. The secondary heat exchange means preferably includes a plurality of heat exchange tubes which extend through a secondary sidewall opening of the closed tank so that the heat exchange tubes are submerged in the water in a lower region of the tank. A preheat means is provided for preheating the air which is supplied to the forced draft burner, thereby further increasing the fuel to water thermal efficiency of the water heater.

Additional objects, features and advantages will be apparent in the written description which follows.

BRIEF DESCRIPTION OF THE DRAWINGS

FIG. 2 is a side, schematic view similar to FIG. 1 but showing a dual tank water heater of the invention.

DETAILED DESCRIPTION OF THE INVENTION

Figure 1:
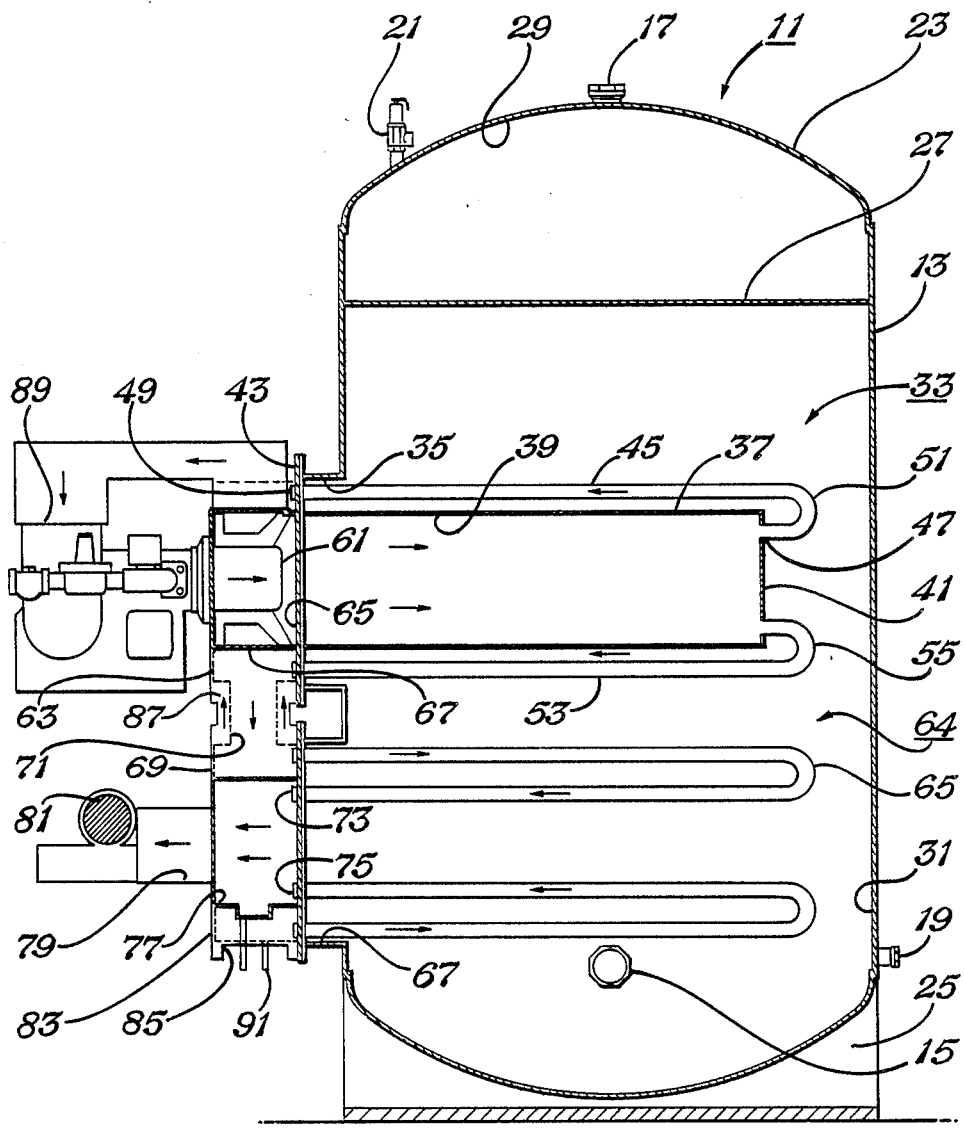
FIG. 1 is a side, schematic view of a single tank water heater of the invention showing the circulation of the combustion air and products of combustion through the internal components of the apparatus.

Turning to FIG. 1, there is shown a water heater of the invention designated generally as 11. The water heater 11 includes a storage tank 13 with a normally closed interior containing water under pressure. The tank 13 has a cold water inlet 15, a hot water outlet 17, a drain valve 19 and a safety pressure release valve 21. The tank 13 is provided with a generally cylindrical body portion having heads or closures on both ends, such as head 23 and a stabilizer skirt 25. A typical water level is indicated at 27 with the upper region 29 of the tank containing steam and the lower region 31 containing cooler water entering the tank from the cold water inlet 15.

A submergible, pressurized combustion chamber assembly, designated generally as 33, is adapted to be received within a primary sidewall opening 35 in tank 13. The submergible portion of the assembly includes a combustion chamber portion 37 adapted to be received within the tank opening 35. Submergible combustion chamber portion 37 comprises a cylindrical elongated member having an open end 39 and having an opposite closed end 41. The combustion chamber assembly 33 also includes a mounting portion for detachably engaging the tank opening 35 for mounting the assembly 33 within the tank. The mounting portion can conveniently comprise a tube mounting flange 43 located adjacent and connected to the combustion chamber open end 39. The tube mounting flange 43 can be a ring like body having an opening in the central part thereof which opening coincides with the opening in open end 39 of combustion chamber 37. The flange 43 can be securely affixed to the chamber 37 as by welding or the like.

The combustion chamber assembly 33 also includes a plurality of curved fire tubes 45 each of which has an end 47 which communicates with the combustion chamber 37 through closed end 41 and which has an opposite end 49 which extends through the opening 35 when in place on tank 13 to the tank exterior. Each of the curved tubes 45 is characterized in that at least a portion 51 of the length thereof is generally U-shaped. The configuration shown in FIG. 1 has a combustion chamber 37 which extends substantially the length of the curved fire tubes 45 creating a long leg 53 running along the exterior of the combustion chamber 37 and separated by U-shaped portion 51 from a short leg 55 which joins and extends through closed end 41.

The ends 49 of curved tubes 45 preferably extend to the tube mounting flange 43 and communicate through flange 43 when the assembly 33 is received within the primary sidewall opening 35. The tube ends 49 can be secured to the flange 43, as by braising the tube ends on the front and back sides of flange 43. Although a small number of curved tubes 45 are shown in FIG. 1 for simplicity, a greater number of tubes and openings are typically used in practice.

The combustion chamber assembly 33 can be mounted on the tank 13 in any convenient fashion. For instance, the tank can be provided with a tank mounting flange comprising a cylindrical ring which is fixedly connected to the tank exterior so as to circumscribe the opening 35 in tank 13 and to extend outwardly therefrom generally normal to the vertical sidewalls of the tank 13. The end area of tank mounting flange can be provided with a plurality of threaded bores which are suitably spaced and alignable with matching bores in the tube flange whereby the fire tube assembly can be bolted to the tank mounting flange.

Further details of the construction and mounting of the combustion chamber assembly 33 are shown in U.S. Pat. No. 4,545,329, issued Oct. 8, 1985, to PVI Industries, Inc., the disclosure of which is incorporated herein by reference.

A flue collector 63 is mounted on the tube mounting flange 43 and has an opening 65 which communicates with the combustion chamber portion 37 and an annular chamber 67 which communicates with the fire tubes 45 by means of openings in the flange 43.

A heat source, such as burner nozzle 61 from an air-fed, forced draft burner, is provided with a series of holes which mate with and receive lugs for bolting the nozzle 61 onto the flue collector 63. In this way, the nozzle burner opening can communicate with the combustion chamber assembly 37, whereby heat from the burner passes through the interior of the submerged combustion chamber 37 and through the fire tubes 45 into the annular chamber of the flue collector 63. Preferably, the nozzle burner 61 is constructed to work against a positive pressure.

A secondary heat exchange means, such as heat exchanger 64 is provided in the tank 13 for preheating the cool water entering the inlet 15 in the lower region 31 of the tank 13. The heat exchanger 64 has at least one heat exchange tube 65 which extends through a secondary sidewall opening 67 provided in the tank 13 so that the heat exchange tube 65 is submerged in the water under pressure. Preferably, a plurality of heat exchange tubes 65 are provided. As shown in FIG. 1, the heat exchanger 64 is provided with a secondary flue collector 69 similar to the primary flue collector. Passage means 71 connect the primary and secondary flue collectors, whereby the products of combustion generated by the forced draft burner in the combustion chamber 37 are supplied to the heat exchange tube 65 in the secondary heat exchanger 63. The heat exchange tubes 65 are preferably U-shaped with the products of combustion exiting the tube ends 73, 75 and passing through the central opening 77 in the secondary flue collector to an exhaust outlet 79 to be exhausted from the tank. An exhaust fan or power vent 81 assists in pulling the products of combustion from the combustion chamber through the primary and secondary flue collectors and out the exhaust outlet 79.

The primary and secondary flue collectors are surrounded by a preheat cowling 83 which includes a combustion air inlet 85 and an internal flow path 87 for conducting combustion air from the inlet 85 over the primary and secondary flue collectors to the burner inlet 89. Condensate outlet 91 is provided for removing condensate created by the warming of the combustion air as it travels over the flue collectors.

Referring to FIG. 1, the operation of the invention will now be described. Preheat air at 70° F. is heated as it travels through cowling 83 and is introduced to the burner inlet 89 at approximately 150° F. The resulting combustion temperature in the chamber portion 37 is approximately 1,800° F. The products of combustion are routed through the U-shaped fire tubes 45 and through the passage means 71 to the secondary flue collector and the heat exchange tubes 65 before being expelled from the exhaust outlet 79 at approximately 70° F. As a result, the water in the lower region 31 of the tank 13 is preheated to approximately 70° F. The water in the upper region of the tank 13 is heated to approximately 140° F. prior to exiting the hot water outlet 17. ANSI standard Z.21.10.3 outlines the accepted industry method of testing thermal efficiency of water heaters. Using the thermal efficiency testing method outlined in Section 2.8 of the above standard, the device of the invention has a fuel-to-water thermal efficiency which exceeds 98%. Other air and water temperatures may also be used with the same efficiency results.

FIG. 2 illustrates another embodiment of the invention featuring a dual water storage tank arrangement. The submergible pressurized combustion chamber assembly 33 is mounted within a combustion tank 93 while the secondary heat exchanger 64 is mounted within a separate preheat tank 95. A crossover tube assembly 97 establishes fluid communication between the preheat tank 95 and the combustion tank 93. The preheat and combustion tanks are supported by a base 101 on a surrounding support surface 107, such as the floor. Each of the tanks has a longitudinal axis 103, 105 which are parallel to the plane of the surrounding support surface 107. Preferably, the combustion tank 93 is mounted on the base 101 over the preheat tank 95 in vertical fashion with the axes 103, 105 extending in parallel planes with respect to the support surface 107. In all other respects, the operation of the water heater of FIG. 2 is identical to that of FIG. 1. That is, the products of combustion created in the chamber portion 37 pass out the curved fire tubes 45 to the primary flue collector and through the passage means to the secondary flue collector where they are routed through the heat exchange tubes 65. The products of combustion are then routed through the central opening of the secondary flue collector to the exhaust outlet 79.

An invention has been provided with several advantages. The devices of the invention can accommodate virtually any BTU capacity requirement from 50,000 to 20,000,000 BTU's. The device can utilize a gas, oil or gas/oil type burner as the power source. The combustion chamber and heat exchanger can be removed from the tank for ease of maintenance or replacement. The submerged combustion chamber, along with the submerged heat exchanger and preheat of combustion air at the burner inlet produce a near stoichiometric combustion with a resulting fuel-to-water thermal efficiency which exceeds 98%. Because the entering cold water is preheated, thermal shock is eliminated adding to the life of the device. While the device has been shown in only two of its forms, it is not thus limited but is susceptible to various changes and modifications without departing from the spirit thereof.

I claim:

1. A water heater of the type having a closed tank normally containing water under pressure with a sidewall extending between the top and bottom of the closed tank and having a primary and secondary openings in the sidewall, the water heater comprising:

a submergible, pressurized combustion chamber with multiple external heating surfaces, said combustion chamber extending through the primary sidewall opening of the closed tank so that all of the heating surfaces are submerged in the water under pressure;

an air-fed, forced draft burner having a burner inlet and being mounted on the exterior of the closed tank and communicating with said combustion chamber for causing combustion to take place within said submergible, pressurized combustion chamber so that substantially all combustion takes place in the tank assembly to minimize heat loss;

a secondary heat exchanger having a plurality of heat exchange tubes, said secondary heat exchanger extending through the secondary sidewall opening of the closed tank so that said heat exchange tubes are submerged in the water under pressure;

passage means for conducting products of combustion generated by said air-fed, forced draft burner in said combustion chamber to said secondary heat exchanger; and preheat means for preheating the air being supplied to the forced draft burner.

2. The water heater of claim 1, further comprising:

mounting means for installing the combustion chamber and the secondary heat exchanger within the respective sidewall openings of the tank assembly; and wherein said combustion chamber comprises a substantially cylindrical body portion having an open end located adjacent the mounting means which communicates with the exterior of the tank assembly and a closed end at the opposite end of the body portion.

3. The water heater of claim 2, wherein each of said fire tubes has a short leg which extends through the closed end of said body portion to communicate with the interior of the combustion chamber at said closed end and a long leg which extends adjacent the body portion through said mounting means.

4. The water heater of claim 3, wherein a primary flue collector is mounted on the exterior of said closed tank having a flue opening therein which communicates with said open end of said body portion, said primary flue collector having an annular chamber surrounding said flue opening and separated therefrom, said annular chamber communicating with said long leg of each of said fire tubes through said mounting means.

5. The water heater of claim 4, wherein said burner has a nozzle for mounting through said flue opening wherein heat from said burner passes through said combustion chamber, through said fire tubes and into said primary flue collector.

6. The water heater of claim 5, wherein said secondary heat exchanger is provided with a secondary flue collector and wherein said products of combustion pass from said secondary flue collector to an exhaust outlet to be exhausted from said tank.

7. The water heater of claim 6, wherein passage means connect said primary and secondary flue collectors, whereby the products of combustion generated by said air-fed, forced draft burner in said combustion chamber are supplied to the heat exchange tubes in said secondary heat exchanger.

8. The water heater of claim 7, wherein said preheat means for preheating the air being supplied to the forced draft burner comprises a preheat cowling which surrounds said primary and secondary flue collectors, said preheat cowling including a combustion air inlet and an internal flow path for conducting combustion air from the combustion air inlet over the primary and secondary flue collectors to the burner inlet.

9. The water heater of claim 8, wherein said forced draft burner creates a positive pressure within said combustion chamber for forcing said products of combustion through said fire tubes and through said primary and secondary flue collectors to said exhaust outlet.

10. The water heater of claim 9, wherein said exhaust outlet includes an exhaust fan for pulling the products of combustion from said combustion chamber through said primary and secondary flue collectors and out said exhaust outlet.

11. A water heater assembly of the type having a preheat tank and a combustion tank, both tanks normally containing water under pressure, the water heater assembly comprising:

a submergible, pressurized combustion chamber with multiple external heating surfaces, said combustion chamber extending through a primary sidewall opening provided in said combustion tank so that all of the heating surfaces are submerged in the water under pressure;

an air-fed, forced draft burner having a burner inlet and being mounted on the exterior of the combustion tank and communicating with said combustion chamber for causing combustion to take place within said submergible, pressurized combustion chamber so that substantially all combustion takes place in the tank assembly to minimize heat loss;

a secondary heat exchanger having a plurality of heat exchange tubes, said secondary heat exchanger extending through a secondary sidewall opening provided in the preheat tank so that said heat exchange tubes are submerged in the water under pressure;

passage means for conducting products of combustion generated by said air-fed, forced draft burner in said combustion chamber to said secondary heat exchanger; and preheat means for preheating the air being supplied to the forced draft burner.

12. The water heater assembly of claim 11, further comprising cross over means for establishing fluid communication between said preheat and said combustion tanks.

13. The water heater assembly of claim 12, wherein said preheat and combustion tanks are supported by a base on a surrounding support surface and wherein each of said tanks has a longitudinal axis, said tanks being supported on said base so that each of said longitudinal axes is parallel to the plane of the surrounding support surface.

14. The water heater of claim 13, wherein said combustion tank is mounted over said preheat tank on said base.

* * * * *